W. H. DECKER.
GEARING FOR WASHING MACHINES.
APPLICATION FILED MAR. 17, 1913.
1,083,435.
Patented Jan. 6, 1914.
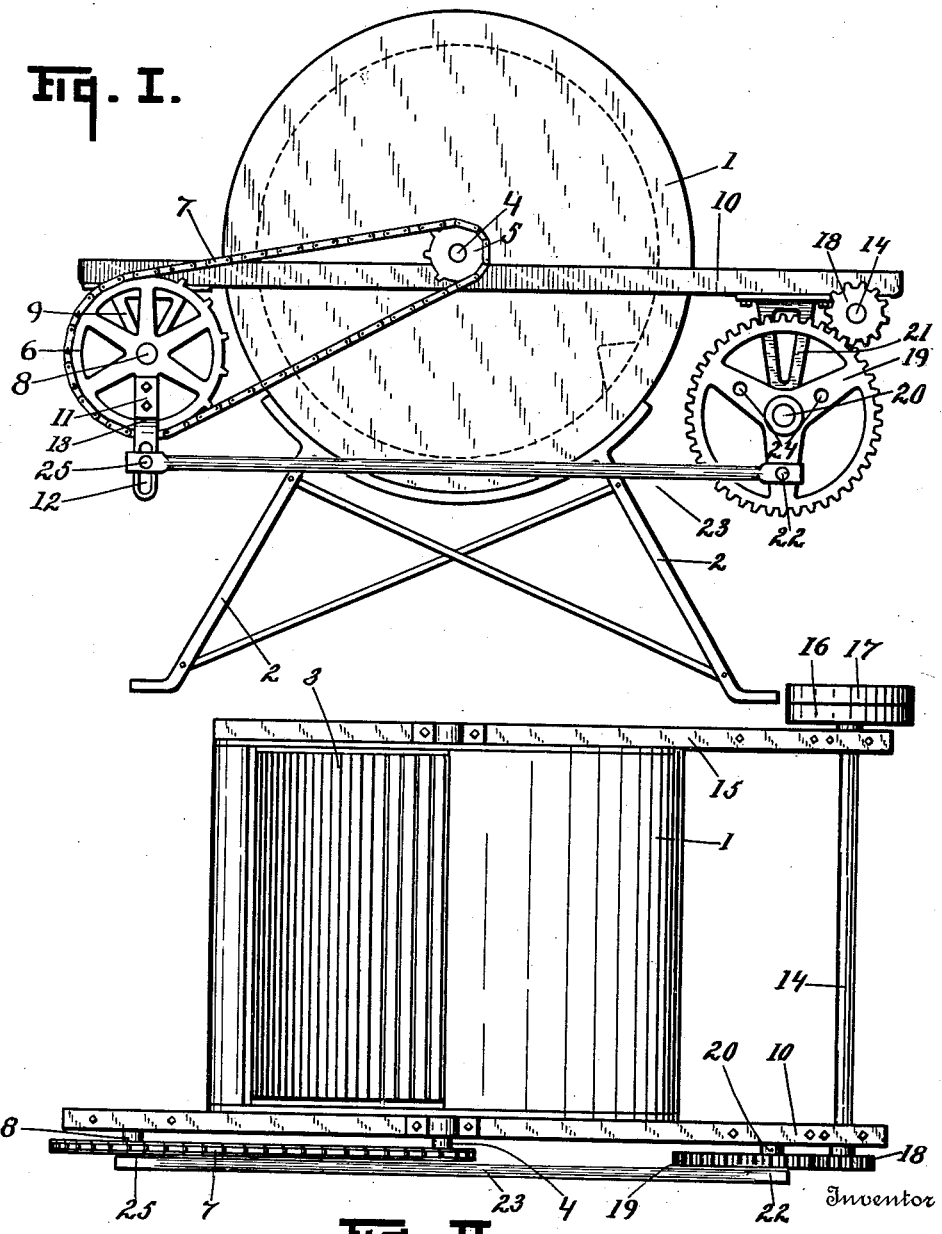

UNITED STATES PATENT OFFICE.

WILLIAM H. DECKER, OF KALAMAZOO, MICHIGAN.

GEARING FOR WASHING-MACHINES.

1,083,435. Specification of Letters Patent. Patented Jan. 6, 1914.

Application filed March 17, 1913. Serial No. 754,844.

*To all whom it may concern:*

Be it known that I, WILLIAM H. DECKER, a citizen of the United States, residing at Kalamazoo, Michigan, have invented certain new and useful Improvements in Gearings for Washing-Machines, of which the following is a specification.

This invention relates to improvements in gearing for washing machines.

My improvements are especially designed by me for embodiment in cylinder washing machines operated by power although desirable and advantageous for use in hand machines. I have shown the same in the accompanying drawing as embodied in a power machine without regard, however, to the relative proportioning of the parts.

The main objects of this invention are: first, to provide an improved gearing for oscillating cylinder washing machines by means of which the oscillation of the cylinder or the stroke of the cylinder may be adjusted. Second, to provide an improved gearing for oscillating cylinder washing machines, in which the wear and strain upon the gearing is minimized.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing forming a part of this specification, in which:

Figure I is a side elevation of a structure embodying the features of my invention. Fig. II is a plan view of the structure appearing in Fig. I.

In the drawing, similar reference numerals refer to similar parts in both views.

Referring to the drawing, the body 1 of the washer is supported on a suitable base 2. The cylinder 3 is carried by the cylinder shaft 4. On the shaft 4 is a sprocket 5 which is connected to the sprocket 6 by means of the sprocket chain 7. The journal 8 of the sprocket 6 is supported on the hanger 9. This hanger 9 is carried by the horizontally disposed bar 10. The sprocket 6 is provided with a radially disposed arm 11 having a longitudinal slot 12 therein. The arm 11 is bolted to one of the spokes of the sprocket and is offset laterally at 13 so as not to interfere with the chain 7.

The driving shaft 14 is mounted in suitable bearings on the bar 10 and on the oppositely disposed bar 15. The driving shaft is provided with tight and loose pulleys 16 and 17. On the driving shaft 14 is a driving pinion or gear 18 which meshes with the teeth of the toothed crank wheel 19. The journal 20 of the crank wheel 19 is carried by the hanger 21 on the bar 10. The wrist pin 22 for connecting the connecting rod 23 to the crank wheel is adapted to be arranged in one or another of the holes 24 which are arranged at varying distances from the center of the journal of the crank wheel, so that the stroke of the connecting rod may be regulated. The connecting rod is connected to the arm 11 on the sprocket 6 by means of the pin 25 engaging the slot 12 so that the stroke of the sprocket is further regulated, thus controlling the stroke of the cylinders. By this gearing I am enabled to regulate the stroke of the washing cylinder as desired, and power is transmitted with a minimum of wear and strain on the parts.

In order to secure the most effective result in a washing machine of this character, it is desired to oscillate the washing cylinder to such an extent that the articles being washed will be carried up as far as possible on the upstroke of the cylinder before dropping, and further, that the stroke will be reversed abruptly so that the articles will be dashed down with as much force as possible. This movement causes heavy strain and wear on the gearing as ordinarily employed. My improved gearing is adapted to effectively withstand this strain and the wear is minimized.

Having thus described my invention, what I claim as new and desire to secure by Letters Patent is:

1. In a washing machine, the combination of the washing cylinder shaft, a sprocket wheel on said shaft, a sprocket wheel having a radially disposed longitudinally slotted arm thereon, a sprocket chain connecting said sprocket wheels, a driving shaft, a gear thereon, a toothed crank wheel meshing with said gear on said driving shaft, and a connecting rod adjustably connected to said crank wheel, whereby the stroke of the connecting rod may be adjusted and adjustably connected to said slotted arm by means of a pin engaging a slot thereof, all coacting substantially as described.

2. In a washing machine, the combination of the washing cylinder shaft, a sprocket wheel on said shaft, a sprocket wheel having a radially disposed longitudinally slotted arm thereon, a sprocket chain connecting said sprocket wheels, a driving shaft, a gear thereon, a toothed crank wheel meshing with said gear on said driving shaft, and a connecting rod connected to said crank wheel and adjustably connected to said slotted arm by means of a pin engaging a slot thereof, all coacting substantially as described.

3. In a washing machine, the combination of the washing cylinder shaft, a sprocket wheel on said shaft, a sprocket wheel having a radially disposed arm thereon, a sprocket chain connecting said sprocket wheels, a driving crank wheel, and a connecting rod adjustably connected to said crank wheel whereby the stroke of the connecting rod may be adjusted and adjustably connected to said arm on said sprocket, all coacting substantially as described.

4. In a washing machine, the combination of the washing cylinder shaft, a sprocket wheel on said shaft, a sprocket wheel having a radially disposed arm thereon, a sprocket chain connecting said sprocket wheels, a driving crank wheel, and a connecting rod connected to said crank wheel and connected to said arm on said sprocket, all coacting substantially as described.

In witness whereof, I have hereunto set my hand and seal in the presence of two witnesses.

WILLIAM H. DECKER. [L. S.]

Witnesses:
M. PHINA WOODRUFF,
PEARL E. LILLIE.

---

Copies of this patent may be obtained for five cents each, by addressing the "Commissioner of Patents, Washington, D. C."